United States Patent
Takigawa

[15] 3,658,292
[45] Apr. 25, 1972

[54] BUTTERFLY VALVE SEAL

[72] Inventor: Tamekichi Takigawa, Kobe, Japan

[73] Assignee: Okamura Valve Mfg. Co., Ltd., Hikone-shi, Shiga-ken, Japan

[22] Filed: Mar. 13, 1970

[21] Appl. No.: 19,259

[30] Foreign Application Priority Data

Apr. 10, 1969  Japan...................................44/32112

[52] U.S. Cl..............................................251/306, 251/173
[51] Int. Cl.................................................................F16k 1/22
[58] Field of Search.................................251/173, 175, 306

[56] References Cited

UNITED STATES PATENTS

| | | | |
|---|---|---|---|
| 2,893,682 | 7/1959 | Hintzman | 251/173 |
| 2,980,388 | 4/1961 | White | 251/175 |
| 2,888,036 | 5/1959 | Reppert | 251/175 X |

FOREIGN PATENTS OR APPLICATIONS 1,006,377  9/1965  Great Britain........................251/306

Primary Examiner—Harold W. Weakley
Attorney—Chittick, Pfund, Birch, Samuels & Gauthier

[57] ABSTRACT

A flexible seal, affixed on outer periphery of a rotatable disc of a butterfly valve which closes or opens a flow of a fluid through a passage, the seal forming a valve face of frustoconical shape to bed on the butterfly valve seat, and being so formed that a clearance is provided between the seal and the disc to permit a part of the seal to be elastically deformed, when the valve is closed, thus giving a hermetical sealing effect between the face and the seat and that a pressure of the fluid will act on the back side of the face, when the valve is closed, to give an additional hermetical sealing effect.

1 Claims, 3 Drawing Figures

PATENTED APR 25 1972 3,658,292

INVENTOR
Tamekichi Takigawa

BUTTERFLY VALVE SEAL

BRIEF DESCRIPTION

The present invention is related to an improved sealing device for use with a butterfly valve, and more particularly to a valve seal ring of resilient flexible material having a generally channel-shaped cross-section, affixed by means of a fixing plate to a butterfly valve disc rotatable on a diametral axis with the two parallel side flanges of the channel-shaped seal extending axially away from the axis, the outer surface of the outer flange forming a valve face of frustoconical shape to conform generally to a tapered valve seat. A clearance is provided between a part of the seal and the disc so as to allow the seal partially flexed elastically when the valve is being closed, whereby a hermetical sealing between the valve face and the seat is effected. When the valve is closed, the pressure of the fluid acts on the inner surface of the outer flange, i.e. the back side of the valve face, whereby additional hermetical sealing is effected.

The advantages of the invention will become more apparent as the description proceeds with the aid of the accompanying drawings, wherein, FIG. 1 shows a sectional view of a butterfly valve embodying the present invention, in side elevation.

Figure 1:
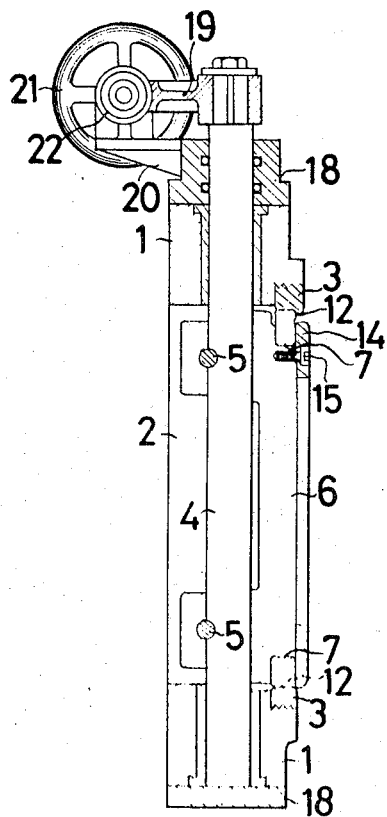
Figure 2:
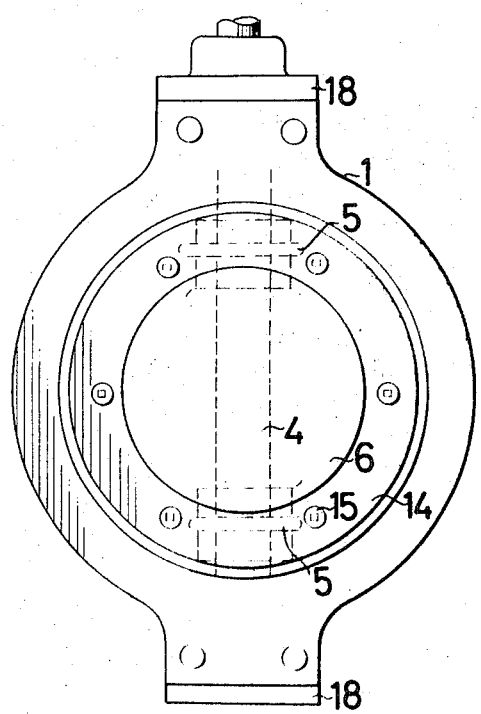
FIG. 2 shows a front view of the embodiment.
Figure 3:
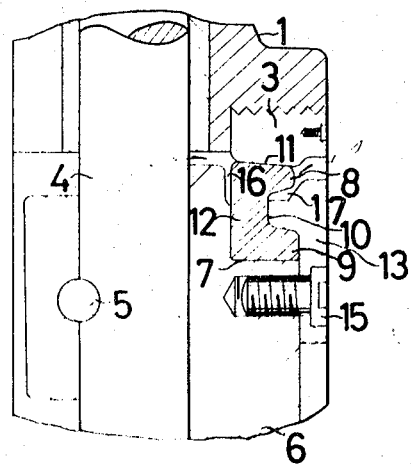
FIG. 3 is another sectional view in enlarged scale, showing more in detail the seal by the present invention.

DETAILED DESCRIPTION:

Referring to FIG. 1 to 3, a valve housing generally indicated as 1 is provided with a valve seat 3 having a frustoconical interior surface in a fluid passage 2. A valve disc 6 is fixed to a rotatable shaft 4 by means of a plurality of tapered pins 5, the shaft in turn being rotatably mounted on the valve housing 1 in a diametral position. Means of any conventional design is provided to prevent any fluid leakage between the shaft 4 and the housing 1, such as a cap 18 as described later.

The outer peripheral corner edge of the disc 6 is out away as at 7, to receive a valve seal ring 12 in a position spaced from the shaft 4. The seal ring 12 of resilient flexible material has a generally channel-shaped cross-section, and is forcibly pressed into the cut-away 7, with its outer and inner flanges 8, 9 extending axially away from the shaft 4. The outer surface 11 of the outer flange 8 has a frustoconical shape generally to conform to the valve seat 3. A clearance is provided as at 16 between the outer part of the cut-away 7 and the seal ring 12.

The seal ring 12 is firmly fixed in place by means of an annular fixing ring plate 14, which has a projecting flange 13, the fixing ring plate 14 in turn being fixed to the disc 6 by means of any conventional means such as bolts 15. The projecting flange 13 closely engages with the annular side groove 10 of the seal ring 12, leaving, however, another clearance as at 17 between the outer flange 8 and the fixing ring plate 14.

The part of the shaft 4, extending out of the housing 1 is hermetically sealed by a cap 18, which is fixed to the housing 1. To the still further extending end of the shaft 4, a worm wheel 18 is integrally fixed, which meshes with a worm 22. The worm 22 is rotatably mounted on the arm extending from the cap 18, and is rotated by a hand wheel 21.

The function of the butterfly valve, herein chosen as an embodiment of the invention, shall now be described.

By rotating the hand wheel 21, the worm 22 and accordingly the worm wheel 18 and the valve disc 6 are rotated, causing the butterfly valve to be closed or opened. When closing the valve, the valve face 11 of the seal ring 12 closely beds on the seat 3, and the clearance 16 makes it possible the seal ring 12 to be elastically flexed by the closing force, giving more tight fit between the seat 3 and the face 11. When the valve is closed, the fluid pressure introduced into the space 17 functions to expand radially and outwardly the outer flange 8, pressing the valve face 11 onto the valve seat 3, whereby additional sealing is effected therebetween according to the pressure of the fluid.

The valve seat 3 may be a separate piece from the housing 1, so that it is replaceable by any conventional means such as screwing-in/out. This will give a wider range for selection of the seat material.

The valve seal ring 12 is also replaceable, as described above, whereby substantial sawing of the maintenance cost is made possible.

What is claimed:

1. For use with a butterfly valve assembly which operates to close or open a passageway through which fluid flows, said valve assembly having a valve seat within an interior frustoconical face and a valve disc which is rotatable about an axis extending transversely to the direction of fluid flow through said passageway, the improvement comprising: a back surface and a bottom surface forming therebetween a peripheral groove on said valve disc, said back surface having inner and outer radially arranged annular faces providing a stepped cross-sectional configuration; a valve seal ring of resilient material seated in said groove, said seal ring having a generally channel-shaped cross-section with radially spaced outer and inner flanges connected by an intermediate section, said seal ring being fixed in said groove against said bottom surface and the inner annular face of said back surface by retaining means having a lip protruding into the space between said flanges, the outer surface of said outer flange forming a frustoconical face which cooperates in sealing engagement with the frustoconical face of said valve seat when the valve assembly is closed, the outer annular face of said back surface being spaced from the intermediate section of said seal ring to thus provide a first clearance, and said lip being spaced from the outer flange on said seal ring to thus provide a second clearance.

* * * * *